US007191313B2

(12) United States Patent
Takamuki

(10) Patent No.: US 7,191,313 B2
(45) Date of Patent: Mar. 13, 2007

(54) MICROPROCESSOR

(75) Inventor: Hideharu Takamuki, Tokyo (JP)

(73) Assignee: Sony Corporation, Tokyo (JP)

( * ) Notice: Subject to any disclaimer, the term of this patent is extended or adjusted under 35 U.S.C. 154(b) by 452 days.

(21) Appl. No.: 10/227,866

(22) Filed: Aug. 27, 2002

(65) Prior Publication Data

US 2003/0051123 A1 Mar. 13, 2003

(30) Foreign Application Priority Data

Aug. 28, 2001 (JP) ............................ P2001-257968

(51) Int. Cl.
*G06F 9/48* (2006.01)
*G06F 9/54* (2006.01)

(52) U.S. Cl. ...................... 712/202; 712/219; 712/228

(58) Field of Classification Search ................. 712/40, 712/202, 228, 248; 718/108; 714/15; 710/262
See application file for complete search history.

(56) References Cited

U.S. PATENT DOCUMENTS

| 4,851,992 | A | * | 7/1989 | Nakayama | ................... | 718/108 |
| 5,727,211 | A | * | 3/1998 | Gulsen | ........................ | 718/108 |
| 5,893,121 | A | * | 4/1999 | Ebrahim et al. | ............ | 707/206 |
| 6,038,631 | A | * | 3/2000 | Suzuki et al. | ............... | 710/260 |
| 6,088,787 | A | * | 7/2000 | Predko | ........................ | 712/202 |
| 6,691,268 | B1 | * | 2/2004 | Chin | ........................... | 714/726 |

FOREIGN PATENT DOCUMENTS

| JP | 58-196357 | 11/1983 |
| JP | 04-180131 | 6/1992 |
| JP | 04-367034 | 12/1992 |
| JP | 09-073392 | 3/1997 |
| JP | 10-011301 | 1/1998 |
| WO | WO98/13759 | 4/1998 |

OTHER PUBLICATIONS

Office Action of Japanese Patent Application, 2002-220714, Jul. 21, 2005.*
Office Action of Japanese application 2002-220714 issued by Japan on Jul. 21, 2005 in Japanese language.*
Guangzuo Cui et al., Parallel Replacement Mechanism for MultiThread, Advances in Parallel and Distributed Computing, 1997, Proceedings, IEEE, Mar. 21, 1997, pp. 338-344.
Bernard K. Gunther, "Multithreading with Distributed Functional Units". IEEE Transactions on Computers, vol. 46, No. 4, Apr. 1997 pp. 399-411.

* cited by examiner

*Primary Examiner*—Daniel H. Pan
(74) *Attorney, Agent, or Firm*—Oblon, Spivak, McClelland, Maier & Neustadt, P.C.

(57) ABSTRACT

The present invention provides a microprocessor which enables task switching with a small time overhead. Upon reception of input of an interrupt control signal during execution of a task-1, a first program counter is switched to a second program counter and a first register file is switched to a second register file to start execution of a task-2. During the execution of the task-2, a task switch controller controls switches to select the first program counter, first memory devices of a processing pipeline circuit, and the first register file to save data stored in them in a save memory. After the data saving, data on a task-3 saved in the save memory is restored in the first program counter, the first memory devices of the processing pipeline circuit, and the first register file.

8 Claims, 9 Drawing Sheets

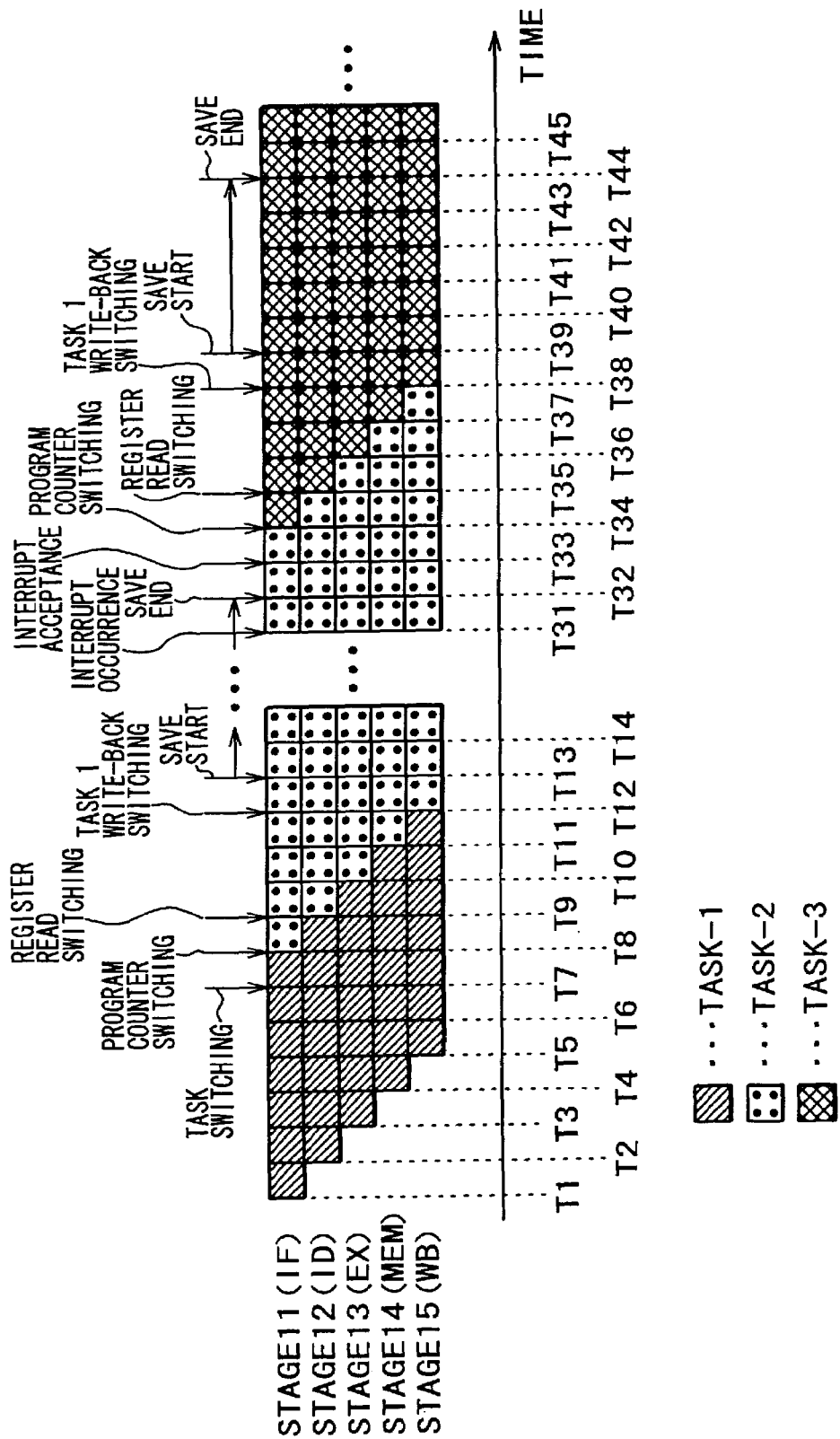

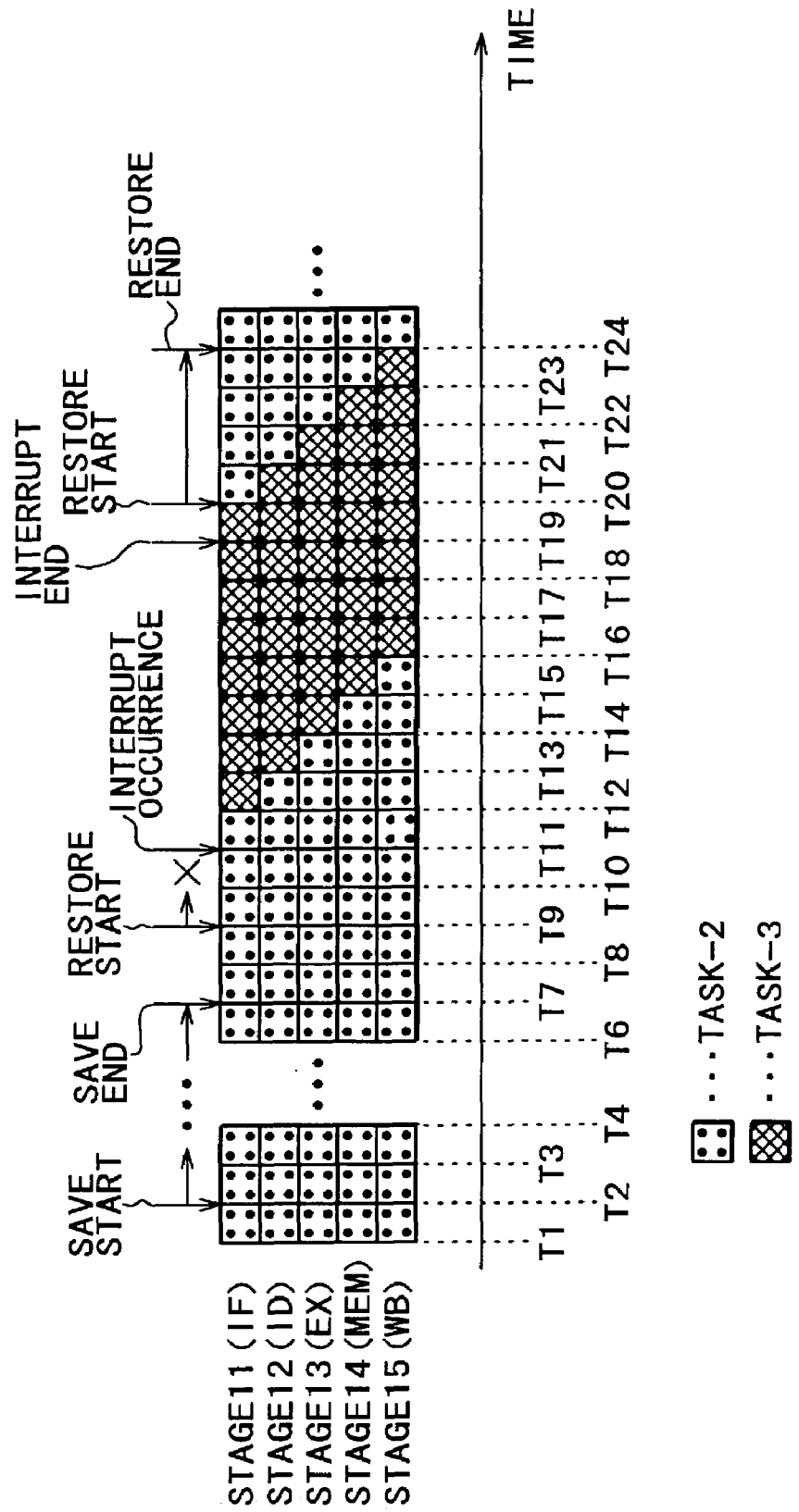

MICROPROCESSOR

CROSS REFERENCES TO RELATED APPLICATIONS

The present document is based on Japanese Priority Document JP 2001-257968, filed in the Japanese Patent Office on Aug. 28, 2001, the entire contents of which being incorporated herein by reference.

BACKGROUND OF THE INVENTION

1. Field of the Invention

The present invention relates to a microprocessor, and more particularly, to a microprocessor which enables task switching with a small time overhead. Specifically, the microprocessor is suitable for use as a processor which requires various types of processing such as demodulation, error correction, and protocol processing as in a software radio technique.

2. Description of the Related Art

In recent years, as electronic equipment is sophisticated, further sophistication and more effective processing are required in microprocessors incorporated in the electronic equipment. In other words, high-speed microprocessors for executing a large amount of programs are needed.

Typically, real-time processing is often required in incorporated microprocessors. It is strongly desirable to reliably execute some of complicated programs with timing limitations imposed thereon in a predetermined time period and to clearly predict whether or not processing time is not excessive when a program is changed.

On the other hand, advanced semiconductor technology in recent years allows a larger number of circuits to be used in a microprocessor than before. If the needs for sophistication and effective processing are satisfied, an increased amount of circuits is often permitted to some extent.

In addition, since the advanced semiconductor technology increases packaging density of circuits, a memory or the like which has been formed on a chip different from a chip having a microprocessor formed thereon can be formed on the same chip to enable a significant increase in bus width between the microprocessor and a memory which has been limited by constraints of the number of pins in a package or the like. Thus, limitations are significantly relaxed in terms of an increase in the bus width and the formation of a plurality of buses.

When a real-time processing is performed in a microprocessor, it is possible to receive input of a nonperiodic or periodic interrupt control signal from an external peripheral circuit to execute a program (a so-called interrupt service) in accordance with various interrupts.

In this event, since the program being executed is not continuous with the interrupt service, the arithmetic result of the program being executed is not changed by the interrupt service by saving an internal status of the microprocessor (for example, a pipeline flip flop used in an arithmetic circuit) or by stalling the execution.

Now, the internal configuration of a conventional microprocessor is described with reference to FIG. 1. FIG. 1 on the whole shows a microprocessor system.

A program counter 1 is a register for storing an address of an instruction (task) to be executed next and supplies the stored address to an instruction memory 2. The instruction memory 2 supplies an instruction read on the basis of the address supplied from the program counter 1 to a processing pipeline circuit 3, that is, an arithmetic circuit. An instruction cache 7 is a buffer memory for performing pseudo high-speed data access by using access locality when the speed of data transmission and reception of the instruction memory 2 is lower than that of the processing pipeline circuit 3.

The microprocessor is formed of five stages of pipelined RISC (Reduced Instruction Set Computer) processors from stages 11 to 15.

The stage 11 reads (IF: Instruction Fetch) the instruction (task) stored in the instruction memory 2 and stores the instruction in a memory device 20. The stage 12 reads and decodes (ID: Instruction Decode) the instruction in the memory device 20 and data stored in a register file 4 and stores the instruction and the data in a memory device 21.

The stage 13 reads and executes (EX: Execution) the instruction stored in the memory device 21 and stores data resulting from arithmetic processing based on the instruction in a memory device 22.

The stage 14 reads the data stored in the memory device 22 and stores the data in a memory device 23. The stage 14 also writes data on an internal status of the processing pipeline circuit 3 and contents in the register file 4 to a data memory 5 (MEM: Memory access), and reads data written to the data memory 5 and restores the data in the processing pipeline circuit 3 and the register file 4. A data cache 6 is typically provided between the data memory 5 and the stage 14 for performing pseudo high-speed data access. The stage 15 reads the data stored in the memory device 23 and writes back (WB: Write Back) the data to the register file 4. In the microprocessor system shown in FIG. 1, a portion other than the instruction memory 2 and the data memory 5 is called a microprocessor (core).

FIG. 2 is a timing chart for explaining task switching performed due to an interrupt service in the microprocessor shown in FIG. 1.

As shown in FIG. 2, at time T1, the stage 11 reads a task-1 stored in the instruction memory 2 and stores the task-1 in the memory device 20. At time T2, the stage 12 reads and decodes the task-1 stored in the memory device 20 and stores the task-1 in the memory device 21. At time T3, the stage 13 reads and executes the task-1 stored in the memory device 21, and stores an arithmetic result thereof in the memory device 22. At time T4, the stage 14 reads the data stored in the memory device 22 and stores the data in the memory device 23. At time T5, the stage 15 reads the data stored in the memory device 23 and writes the data back to the register file 4.

In this manner, a signal input to any stage (for example, the stage 11) is supplied to the next stage (the stage 12, in this case) after the lapse of a clock time T. If a next signal input is supplied to the stage (the stage 11) thereafter, the signal is supplied to the next stage (the stage 12) after the lapse of the clock time T. Thus, the next stage (the stage 12) can supply the current signal to the stage subsequent to the next stage (the stage 13, in this case) before the next stage (the stage 12) is influenced by the input to the previous stage (the stage 11).

When a task switch control signal (interrupt service) is produced at time T7, the microprocessor controls address switching of the program counter 1 at time T8 such that the program counter 1 supplies the address of an instruction (task-2) to be executed next to the instruction memory 2. Then, the processing pipeline circuit 3 waits until a register save instruction is produced since a pipelinestall occurs in the processing pipeline circuit 3.

At time T12, the stage 15 writes the data back to the register file 4 (the whole task-1 is discharged). Simultaneously, a register save instruction is produced. The stage 14 saves the data on the internal status of the processing pipeline circuit 3 and the contents of the register file 4 in the data memory 5.

At time T15 when the data saving of the stage 11 is completed, the task-2 stored in the instruction memory 2 is read to start the execution of the task-2. Thereafter, operations similar to those for the task-1 described above are again performed repeatedly.

At time T52 when the execution of the task-2 by the stage 11 is completed, a register return instruction is produced to restore the internal status of the processing pipeline circuit 3 during the execution of the task-1 and the contents of the register file 4 from the data memory 5. At time T55 when the data restore in the stage 11 is completed, the microprocessor controls the address return of the program counter 1 such that the program counter 11 supplies the address of the instruction (task-1) to be executed next to the instruction memory 2. Then, pipelinestall occurs in the processing pipeline circuit 3 which waits until the data restoring in the stage 15 is completed. When the data restoring in the stage 15 is completed at time T59, the execution of the task-1 is restarted to repeat the aforementioned operations.

In this manner, the internal status of the processing pipeline circuit 3 during execution of the task and the contents of the register file 4 are saved before the reception of the interrupt service to avoid corruption of the contents of the register file 4 by the execution of the interrupt service program. In a case of returning from the interrupt service, the saved internal status of the processing pipeline circuit 3 and the saved contents of the register file 4 are restored so as to prevent the interrupt service from changing the arithmetic result of the program being executed before the interrupt service.

In addition, there is a microprocessor as shown in FIG. 3, in which two register files 4-1 and 4-2 are provided such that tasks can be switched instantaneously by switching the register files in executing an interrupt service. FIG. 3 on the whole also shows a microprocessor system. In FIG. 3, components corresponding to those in FIG. 1 are designated with the same reference numerals, and description thereof is omitted as appropriate.

In the configuration in FIG. 3, a switch 31 and a switch 32 are switched to the selection of the register file 4-2 from the selection of the register file 4-1 such that, when an interrupt service is received during execution of a task stored in one register file 4-1, a task stored in the other register file 4-2 can be executed instantaneously. Consequently, no overhead is produced due to data saving.

FIG. 4 is a timing chart for explaining task switching performed due to an interrupt service in the microprocessor shown in FIG. 3.

As shown in FIG. 4, after a task switch control signal (interrupt service) is produced at time T7, the microprocessor controls the address switching of a program counter 1 at time T8 such that the program counter 1 supplies the address of an instruction (task-2) to be executed next to an instruction memory 2. Then, pipelinestall occurs in a processing pipeline circuit 3. At time T12, a stage 15 writes the data back to the register file 4-1 (the whole task-1 is discharged). Simultaneously, the switches 31 and 32 are switched to the selection of the register file 4-2 from the selection of the register file 4-1, and the task-2 stored in the instruction memory 2 is read and executed.

In this manner, the two register files enables instantaneous switching between the task-1 and the task-2.

In the example shown in FIGS. 1 and 2, however, several tens of clocks must be used for saving the internal status of the register file and the pipelinestall, which presents a problem of producing a relatively large time overhead each time an interrupt service occurs.

In the example shown in FIGS. 3 and 4, when there are multiple interrupt services exceeding the number of the prepared register files (two in FIG. 3), a problem occurs in that a time overhead is produced for saving the internal status of the register file 4 and the pipelinestall, similarly to the example in FIG. 1.

In addition, the provision of a number of the register files, each of which requires the highest-speed operation in a memory hierarchy in the microprocessor, means increases in the circuit scale and the number of wires to result in a problem of obstructing improvement in the clock rate in the microprocessor.

SUMMARY OF THE INVENTION

The present invention has been made in view of the aforementioned conditions, and attempts to enable task switching with a small time overhead and to allow a substantially unlimited number of interrupts to be processed without providing a number of register files.

A microprocessor according to the present invention comprises: at least one-element arithmetic means; at least two-element memory means; control means; save means; and restore means. In the microprocessor, the arithmetic means performs arithmetic processing of data; the memory means stores the data processed by the arithmetic means; the control means performs control to select one of the at least two-element memory means; the save means saves data on a second task held by the other memory means while a first task is executed by using the memory means selected by the control means; and the restore means restores data on a third task which has been saved by the save means in the other memory means while the first task is executed by using the memory means selected by the control means.

The control means can perform control to select the other memory means when a task switch control signal is produced.

The control means can perform control to select the other memory means when an interrupt control signal is input from the outside.

The control means can perform control such that, if the interrupt control signal is input while the save means is saving the data, the interrupt control signal is held until the data saving is completed by the save means, and the other memory means is selected when the data saving is completed.

The control means can perform control such that, when the interrupt control signal is input while the restore means is restoring the data, the data restoring is stopped and the other memory means is selected.

The memory means may include a register file.

In the microprocessor according to the present invention, one of two storage paths is selected, and during the execution of a first task by using the selected storage path, data on a second task held on the other storage path is saved in the memory, and data on a third task which has been saved in the memory is restored in the other storage path. Thus, the task switching can be realized without a time overhead for a substantially unlimited number of interrupt services. Since an overhead is eliminated, it is possible to efficiently perform high-speed switching of different kinds of processing (such as demodulation and error correction) required for software radio or the like.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 8 is another timing chart for explaining task switching performed due to an interrupt service from the outside in the microprocessor shown in FIG. 5; and FIG. 9 is another timing chart for explaining task switching performed due to an interrupt service from the outside in the microprocessor shown in FIG. 5.

DESCRIPTION OF THE PREFERRED EMBODIMENT

An embodiment of the present invention will hereinafter be described.

Figure 5:
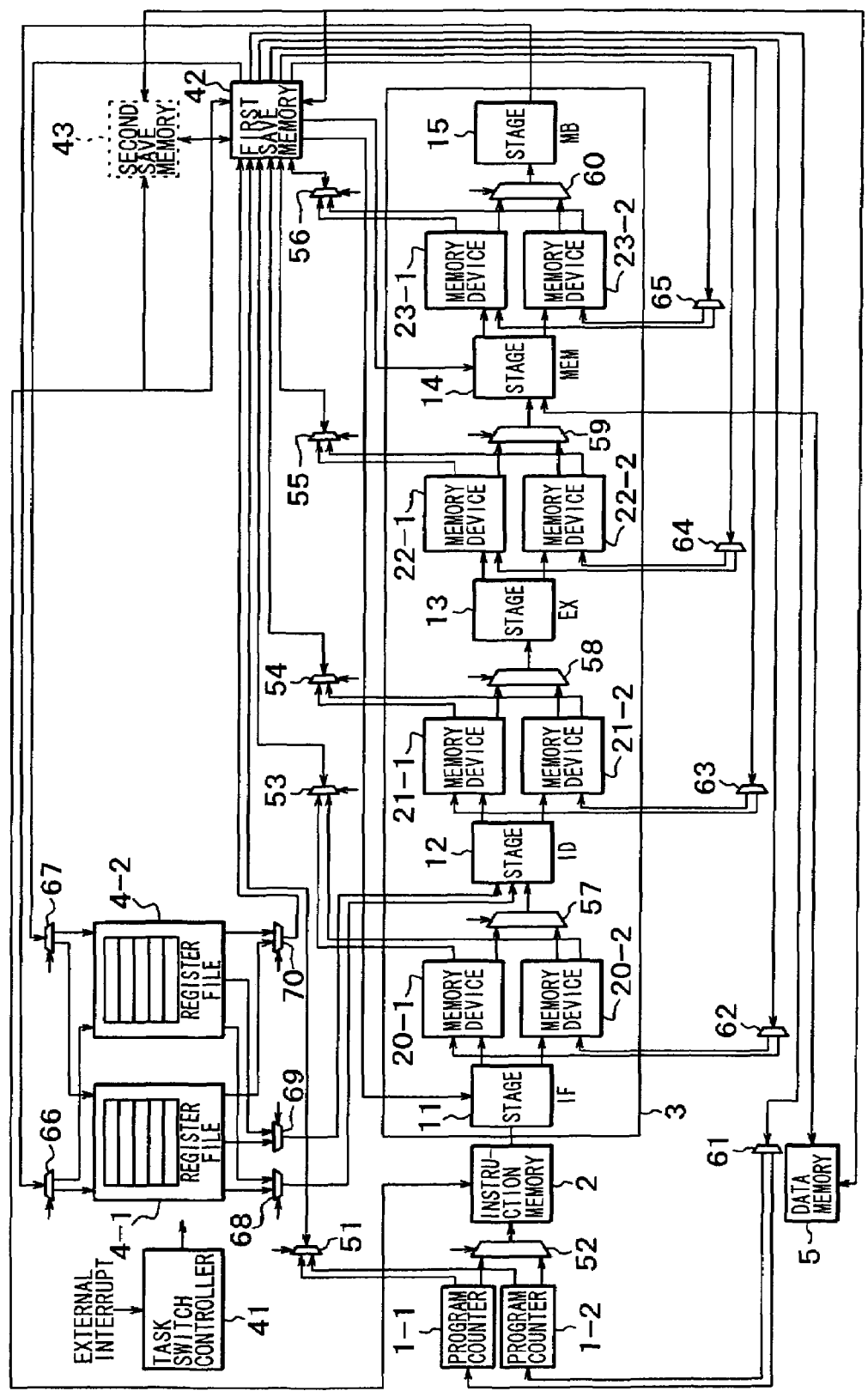
FIG. 5 is a block diagram showing an internal configuration of a microprocessor to which the present invention is applied.

FIG. 5 is a block diagram showing an example of the internal configuration of a microprocessor to which the present invention is applied. Strictly speaking, an instruction memory 2 and a data memory 5 are not included in the microprocessor. The microprocessor excluding them is referred to as a microprocessor core. Components corresponding to the related art are designated with the same reference numerals, and description thereof is omitted as appropriate. In the present invention, each of a program counter 1, a register file 4, and memory devices 20 to 23 in a processing pipeline circuit 3 is formed of two elements, but it goes without saying that they may be formed of a plurality of elements of the number other than two. In contrast, each of stages 11 to 15 is formed of a single element.

A task switch controller 41 controls switches 51 to 70 in the microprocessor to be switched by a task switch control signal produced at predetermined time periods or by input of an external interrupt control signal. In the initial state, the task switch controller 41 controls a switch 52 to select a program counter 1-1 of program counters 1-1 and 1-2, controls switches 57 to 60 to select memory devices 20-1, 21-1, 22-1 and 23-1 of a two-element pipeline in the processing pipeline circuit 3, and controls switches 68 and 69 to select a register file 4-1 of register files 4-1 and 4-2.

The switch 51 is a switch (selecting device) for save reading, and supplies an address provided from the program counter 1-1 or 1-2 to a first save memory 42 under the control of the task switch controller 41. The switch 52 supplies an address provided from the program counter 1-1 or 1-2 to the instruction memory 2 under the control of the task switch controller 41.

The instruction memory 2 supplies an instruction (task) read in accordance with the address provided from the program counter 1-1 or 1-2 through the switch 52 to the processing pipeline circuit 3.

The processing pipeline circuit 3 constitutes five stages of pipelined RISC processors from stages 11 to 15, and is formed in the two-element pipeline since two memory devices are provided for each stage. While the embodiment shows the example of the pipeline including the five stages, the number of stages is arbitrarily determined and may be larger or smaller than five.

The stage 11 reads an instruction (task) stored in the instruction memory 2 and stores the instruction in the memory device 20-1 or 20-2. The stage 12 reads the instruction stored in the memory device 20-1 or 20-2 through the switch 57, and reads and decodes data stored in the register file 4-1 or 4-2 through the switch 68 or 69, and stores the data in the memory device 21-1 or 21-2.

The stage 13 reads the instruction stored in the memory device 21-1 or 21-2 through the switch 58, executes the read instruction, and stores the resulting data from the arithmetic processing in accordance with the instruction in the memory device 22-1 or 22-2.

The stage 14 reads the data stored in the memory device 22-1 or 22-2 through a switch 59 and stores the data in the memory device 23-1 or 23-2. The stage 14 also writes data obtained by the execution of the task to the data memory 5, and reads data written to the data memory 5 and stores the read data in the memory device 23-1 or 23-2.

The stage 15 reads the data stored in the memory device 23-1 or 23-2 through the switch 60 and writes the data back to the register file 4-1 or 4-2.

A switch 53 is a switch (selecting device) for save reading, and supplies the instruction (task) read from the memory device 20-1 or 20-2 to the first save memory 42 under the control of the task switch controller 41. A switch 54 is a switch for save reading, and supplies the data read from the memory device 21-1 or 21-2 to the first save memory 42 under the control of the task switch controller 41. A switch 55 is a switch for save reading, and supplies the data read from the memory device 22-1 or 22-2 to the first save memory 42 under the control of the task switch controller 41. A switch 56 is a switch for save reading, and supplies the data read from the memory device 23-1 or 23-2 to the first save memory 42 under the control of the task switch controller 41.

A switch 61 is a switch for restore writing, and supplies the data (address) provided from the first save memory 42 to the program counter 1-1 or 1-2. A switch 62 is a switch for restore writing, and supplies the data (instruction) provided from the first save memory 42 to the memory device 20-1 or 20-2. A switch 63 is a switch for restore writing, and supplies data provided from the first save memory 42 to the memory device 21-1 or 21-2. A switch 64 is a switch for restore writing, and supplies data provided from the first save memory 42 to the memory device 22-1 or 22-2. A switch 65 is a switch for restore writing, and supplies data provided from the first save memory 42 to the memory device 23-1 or 23-2.

A switch 66 is a switch for writing arithmetic data, and supplies the data written back from the stage 15 to the register file 4-1 or 4-2 under the control of the task switch controller 41.

A switch 67 is a switch for restore writing, and supplies data provided from the first save memory 42 to the register file 4-1 or 4-2 under the control of the task switch controller 41.

The switches 68 and 69 are switches for reading arithmetic data, and supplies the data read from the register file 4-1 or 4-2 to the stage 12 under the control of the task switch controller 41.

The switch 70 is a switch for save reading, and supplies the data read from the register file 4-1 or 4-2 to the first save memory 42 under the control of the task switch controller 41.

Figure 1:
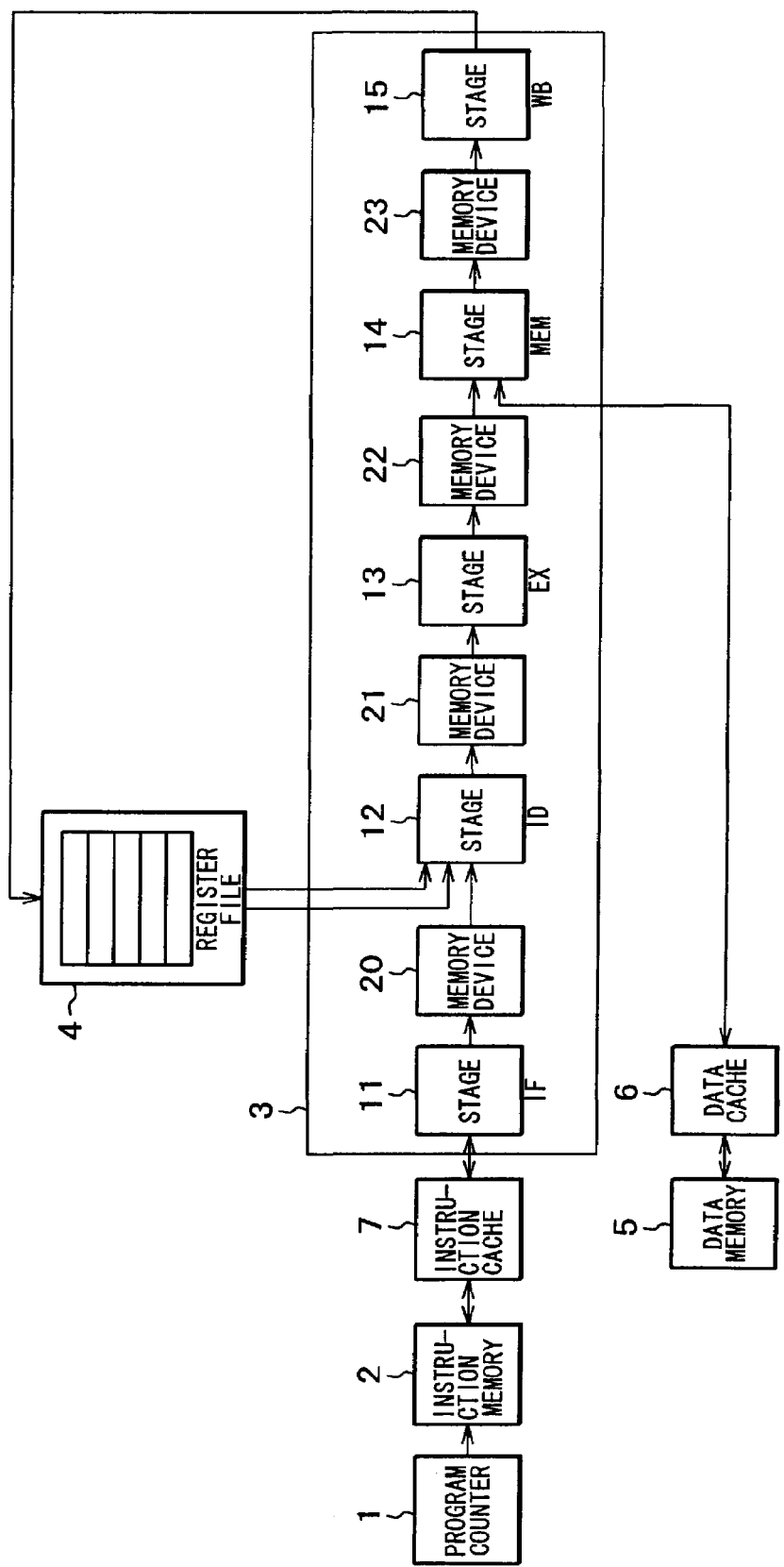
FIG. 1 shows an internal configuration of a conventional microprocessor.
Figure 2:
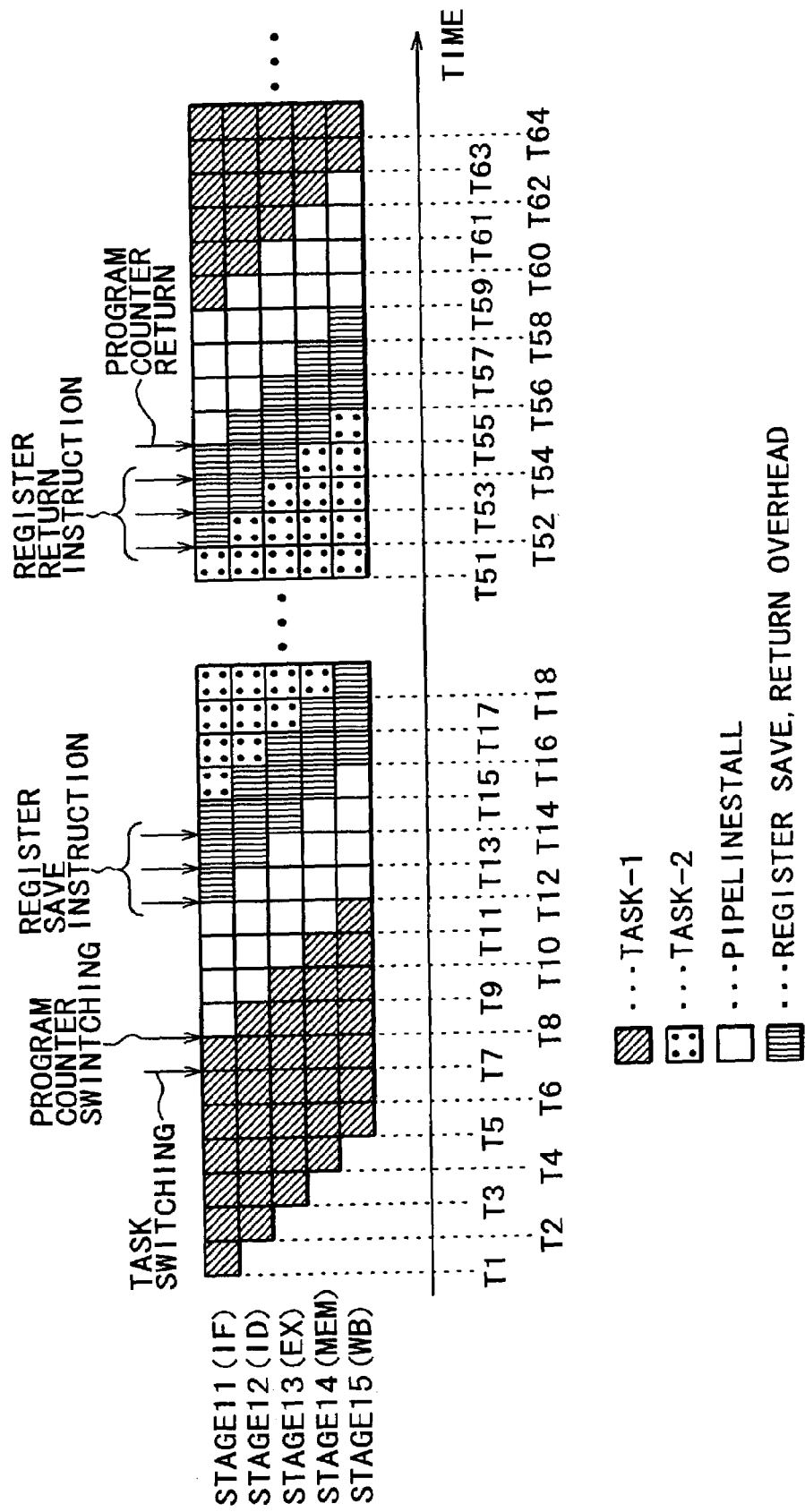
FIG. 2 is a timing chart for explaining task switching performed due to an interrupt service in the microprocessor shown in FIG. 1.
Figure 3:
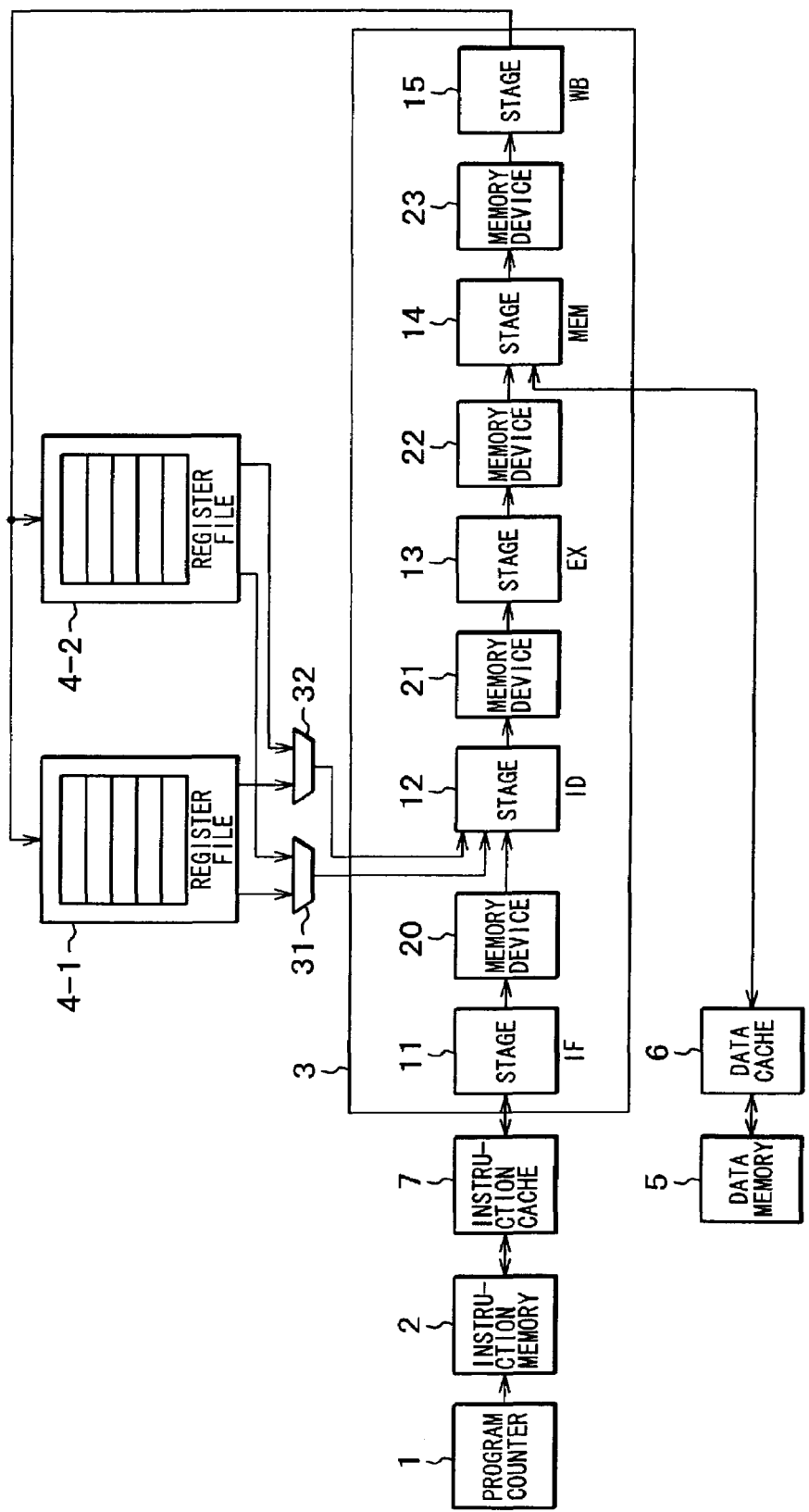
FIG. 3 shows an internal configuration of another conventional microprocessor.
Figure 4:
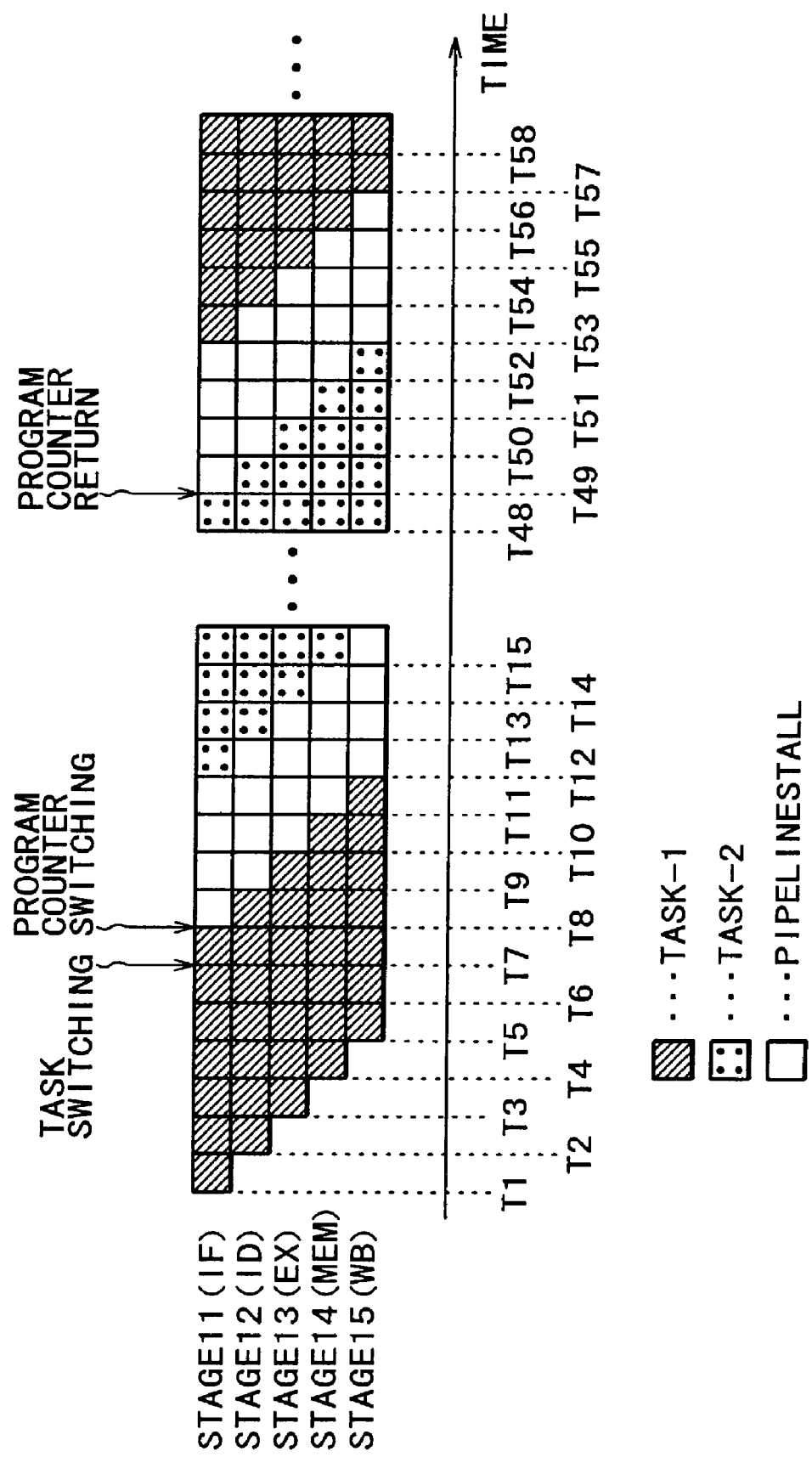
FIG. 4 is a timing chart for explaining task switching performed due to an interrupt service in the microprocessor shown in FIG. 2.

The first save memory 42 writes the save data from the program counter 1-1 or 1-2 supplied through switch 51, the save data from the processing pipeline circuit 3 supplied through the switches 53 to 56, and the save data from the register file 4-1 or 4-2 supplied through the switch 70. The written save data is read out at the time of the restore. A second save memory 43, if present in addition to the first save memory 42, is more preferable. For example, the first save memory 42 has a small capacity but a high access bandwidth, while the second save memory 43 has a large capacity but a low access bandwidth. In this event, multiple phases of processing can be performed such as saving data, which need not be processed immediately, in the second save memory 43. In addition, it is possible that the instruction memory 2 present outside the microprocessor is connected to the first save memory 42 and the second save memory 43 and their inputs and outputs are interconnected with the stage 11 to use the first save memory 42 or the second save memory 43 as an instruction cache (as shown with reference numeral 7 in FIG. 1). Similarly, it is also possible that the data memory 5 present outside the microprocessor is connected to the first save memory 42 and the second save memory 43 and their inputs and outputs are interconnected with the stage 14 to use the first save memory 42 or the second save memory 43 as a data cache (as shown with reference numeral 6 in FIG. 1). The save memories can also function as a cache in this manner to improve the mounting efficiency (area efficiency).

The connection of the instruction memory 2 to the first save memory 42 and the second save memory 43 also allows the save memories to be used as the instruction memory 2. When this is applied to the aforementioned example, the first save memory 42 having a small capacity but a high access bandwidth can be used as the instruction cache, while the second save memory 43 having a large capacity but a low access bandwidth can be used as the instruction memory. The configuration like this also can improve the mounting efficiency (area efficiency).

The present invention can be implemented when the second save memory 43 may be present within or outside the microprocessor.

The data to be saved is multiplexed and sequentially written or simultaneously written in parallel. Similarly, the data to be restored is multiplexed and read out or simultaneously read out in parallel.

Figure 6:
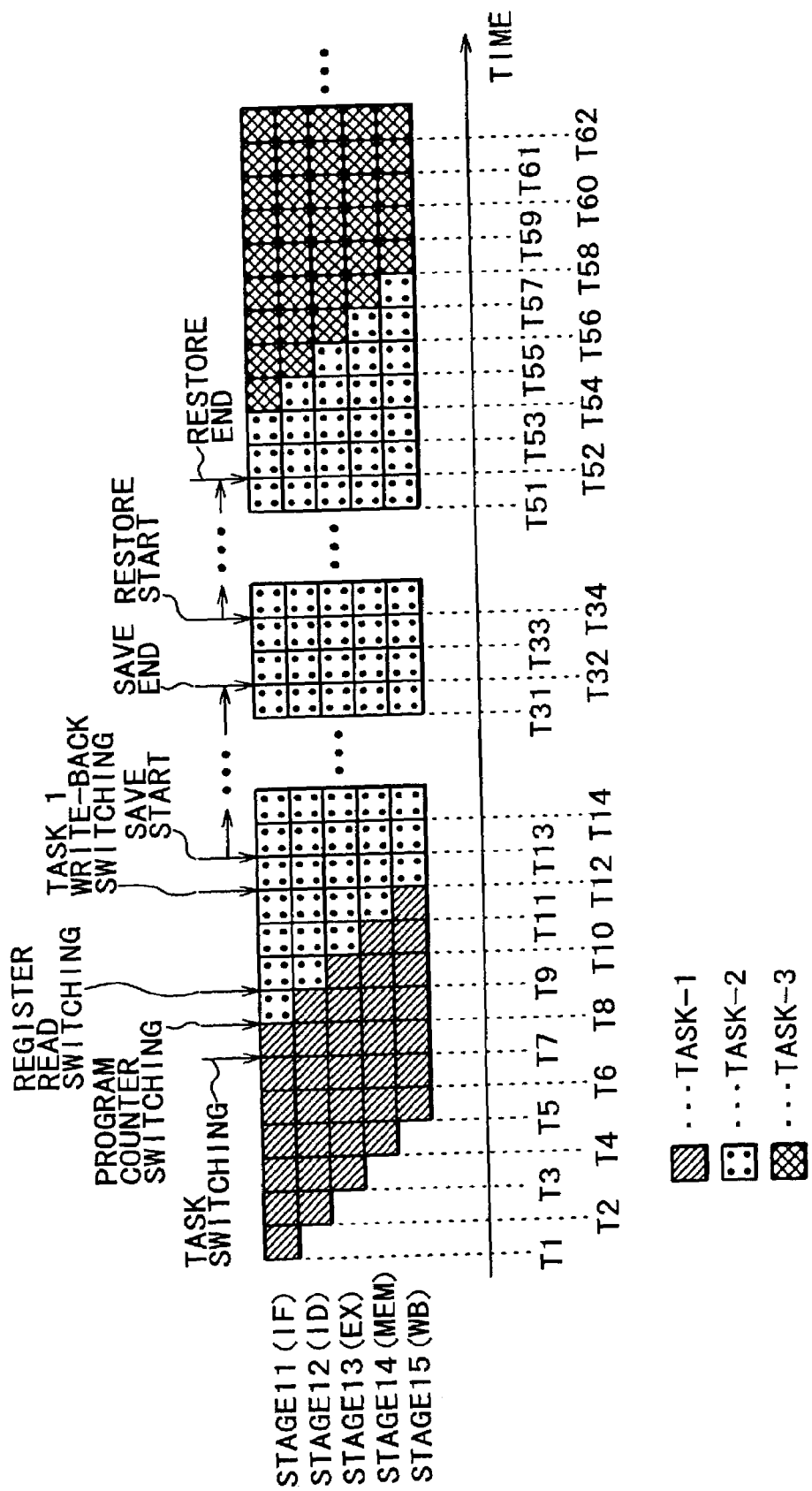
FIG. 6 is a timing chart for explaining task switching performed due to an interrupt service in the microprocessor shown in FIG. 5.

FIG. 6 is a timing chart for explaining task switching performed due to an interrupt service in the microprocessor shown in FIG. 5. Description is made on the assumption that a task-1, a task-2, and a task-3 are scheduled to be performed in this order, the task-3 of the task-1 to task-3 has experienced an interrupt input during the execution and has save data in the first save memory 42, the task-2 has no save data in the first save memory 42, and save data need not be restored at the start of the execution of the task-2. The register file being used for the arithmetic processing is referred to as "processing side," while the register file not being used for the arithmetic processing is as "opposite side" as appropriate.

As shown in FIG. 6, the task-1 is being executed in the initial state. At time T7 when a task switch control signal is produced, the task switch controller 41 controls the switch 52 at time T8 to switch to the selection of the program counter 1-2 from the selection of the program counter 1-1. At time T9, the task switch controller 41 controls the switches 68 and 69 to switch to the path of the register file 4-2 from the path of the register file 4-1. With this control, the register file 4-1 is switched from the "processing side" to the "opposite side" while the register file 4-2 is switched from the "opposite side" to the "processing side" to start the execution of the task-2 stored in the instruction memory 2. Thereafter, the operations similar to that for the task-1 are again executed.

Specifically, the task switch controller 41 switches the switch 57 at time T8 to select the memory device 20-2, switches the switch 58 at time T9 to select the memory device 21-2, switches the switch 59 at time T10 to select the memory device 22-2, and switches the switch 60 at time T11 to select the memory device 23-2. In this manner, switching is made from the execution of the task-1 to the execution of the task-2 for each stage.

At time T12, the data is written back to the register file 4-1 by the stage 15 (the whole task-1 is discharged). Simultaneously, the task switch controller 41 switches the switch 66 to write data back to the register file 4-2. This causes the register file 4-1 to be the "opposite side" (on standby), and this time period is utilized to save the contents of the register file 4-1 and the data on the internal status of the processing pipeline circuit 3 during the execution of the task-1 in the first save memory 42 to restore the task to be executed next.

In this event, since the task-3 is scheduled to be executed subsequent to the task-2, the data on the task-1 is saved and the data on the task-3 is restored during the execution of the task-2.

Specifically, at time T13, the task switch controller 41 switches the switch 51, the switches 53 to 56, and the switch 70 to select the program counter 1-1; the memory devices 20-1, 21-1, 22-1 and 23-1 of the processing pipeline circuit 3; and the register file 4-1, which are on the "opposite side," respectively. The data stored in the program counter 1-1; the memory devices 201, 21-1, 22-1, 23-1 of the processing pipeline circuit 3; and the register file 4-1 are saved in the first save memory 42. After the data saving is completed at time T32, the data on the task-3 saved in the first save memory 42 is written to the program counter 1-1; the memory devices 20-1, 21-1, 22-1, 23-1 of the processing pipeline circuit 3; and the register file 4-1, which are on the "opposite side," and restored at time T34.

In this manner, since the data on the task-3 at the time of the previous switching is restored in the program counter 1-1; the memory devices 20-1, 21-1, 22-1, 23-1 of the processing pipeline circuit 3; and the register file 4-1, which are on the "opposite side," during the execution of the task-2, switching is instantaneously made from the task-2 to the task-3, similarly to the switching from the task-1 to the task-2.

During the execution of the task-3, the data on the task-2 stored in the register file 4-2; the program counter 1-2; the memory devices 20-2, 21-2, 22-2 and 23-2 of the processing pipeline circuit 3, which are on the "opposite side," are saved in the first save memory 42, and the task-1 to be executed next is restored in them, thereby making it possible to perform task switching without a time overhead.

In addition, a plurality of tasks can be freely switched and performed depending on the storage capacity of the first save memory 42.

While the aforementioned description has been made for the task switch control signal supplied at an appropriate timing, it is possible to provide an equal execution time for each task by a free-running counter producing the task switch control signal, by way of example.

Alternatively, a preloadable downcounter may be provided in which a task switch control signal is produced at the time when the downcounter reaches zero and a preload value is loaded into the downcounter when the task switch control signal is produced, so that tasks can be switched at variable intervals only by changing the previously set preload value.

A plurality of registers are provided for holding preload values to be loaded into the downcounter, and the order in which the values in those registers are loaded is set by a program, thereby allowing flexible task switching to be realized.

In addition, while the aforementioned description has been made for predictable task switching, task switching can also be performed without a time overhead for an external interrupt service.

While the description has been made for the first save memory 42 provided in the microprocessor, the present invention is not limited thereto. For example, a cache memory, not shown, may also be used as the save memory.

Figure 7:
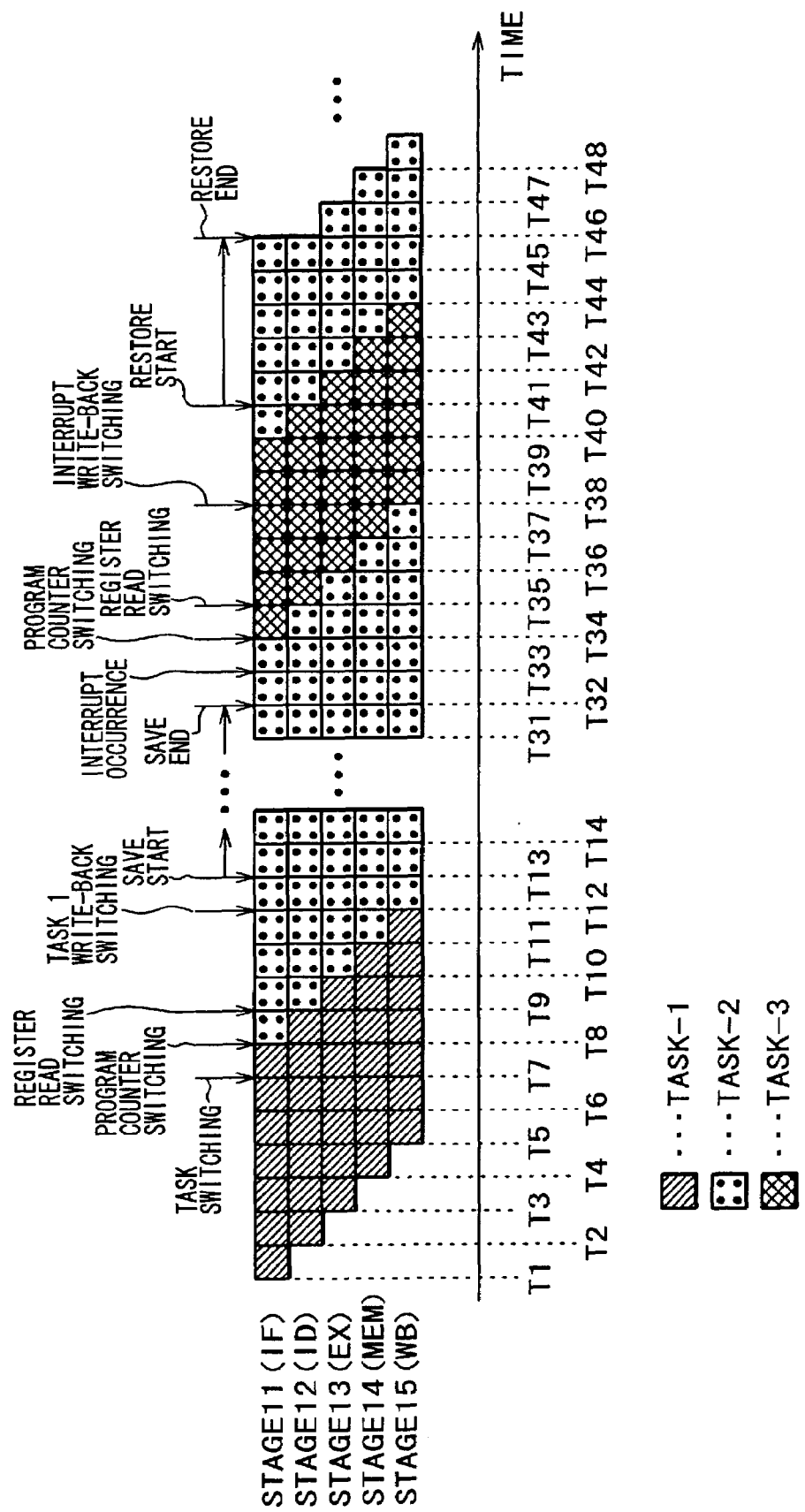
FIG. 7 is a timing chart for explaining task switching performed due to an interrupt service from the outside in the microprocessor shown in FIG. 5.

FIG. 7 is a timing chart for explaining task switching due to an external interrupt service. This example can be handled similarly to normal task switching since the interrupt service occurs at the time when data saving or data restoring is not performed.

As shown in FIG. 7, data saving of a task-1 performed during the execution of a task-2 is completed at time T32. Then, upon reception of input of an interrupt control signal from the outside at time T33, the task switch controller 41 controls the switch 52 at time T34 to switch to the selection of the program counter 1-1 from the selection of the program counter 1-2, and controls the switches 61 to 65 to select the memory devices 20-1, 21-1, 22-1 and 23-1 of the processing pipeline circuit 3. At time T35, the task switch controller 41 controls the switches 68 and 69 to switch to the path of the register file 4-1 from the path of the register file 4-2.

Thus, data on a task-3 saved in the first save memory 42 is restored in the program counter 1-1; the memory devices 20-1, 21-1, 22-1 and 23-1 of the processing pipeline circuit 3; and the register file 4-1 to execute the task-3, while the task-2 which has been executed is suspended. Since the contents of the register file 4-1 and the data on the internal status of the processing pipeline circuit 3 in the execution of the task-1 have already been saved in the first save memory 42, the task-3 can be executed immediately.

At time T38, the data is written back to the register file 4-1 by the stage 15 (the whole task-2 is discharged). Simultaneously, the task switch controller 41 switches the switch 66 to write the task-3 back to the register file 4-1.

At time T40 when the execution of the task-3 by the stage 11 is completed, the task switch controller 41 controls the switches 68 and 69 to switch to the path of the register file 4-2 from the path of the register file 4-1. Thus, the execution of the task-2, which has been suspended by the interrupt, is resumed.

At time T41, the task switch controller 41 switches the switches 61 to 65 and the switch 67 to select the program counter 1-1; the memory devices 20-1, 21-1, 22-1 and 23-1 of the processing pipeline circuit 3; and the register file 4-1, which are on the "opposite side". The data saved in the first save memory 42 is written to the register file 4-1; the program counter 1-1; the memory devices 20-1, 21-1, 22-1 and 23-1 of the processing pipeline circuit 3 and restored.

In this manner, the program counter 1-1; the memory devices 20-1, 21-1, 22-1 and 23-1 of the processing pipeline circuit 3; and the register file 4-1, which are not being used, are applied to the arithmetic processing of the interrupted task to eliminate the need to hold the state of the interrupted and temporarily suspended task-2. In other words, data saving and data restoring are not necessary.

FIG. 8 is another timing chart for explaining task switching due to an external interrupt service. This example is described in connection with the operations when an interrupt service occurs during data saving.

As shown in FIG. 8, at time T31 during data saving performed while the task-2 is executed, an interrupt control signal is received from the outside. In response thereto, the task switch controller 41 once holds the reception of the signal and waits until the data saving is completed.

After the data saving performed during the execution of the task-2 is completed at time T32, the task switch controller 41 receives the input of the held interrupt control signal at time T33. At time T34, the task switch controller 41 controls the switch 52 to switch to the selection of the program counter 1-1 from the selection of the program counter 1-2, and controls the switches 61 to 65 to select the memory devices 20-1, 21-1, 22-1 and 23-1 of the processing pipeline circuit 3. At time T35, the task switch controller 41 controls the switches 68 and 69 to switch to the path of the register file 4-1 from the path of the register file 4-2.

Thus, the data on the task-3 saved in the first save memory 42 is restored in the program counter 1-1; the memory devices 20-1, 21-1, 22-1 and 23-1 of the processing pipeline circuit 3; and the register file 4-1, respectively, to execute the task-3, while the task-2 which has been executed is suspended.

At time T38, the data is written back to the register file 4-2 by the stage 15 (the whole task-2 is discharged). Simultaneously, the task switch controller 41 switches the switch 66 to write the task-3 back to the register file 4-1. At time T39, the task switch controller 41 switches the switch 51, the switches 53 to 56, and the switch 70 to select the program counter 1-2; the memory devices 20-2, 21-2, 22-2 and 23-2 of the processing pipeline circuit 3; and the register file 4-2, which are on the "opposite side", respectively. Then, the data stored in the program 1-2; the memory devices 20-2, 21-2, 22-2 and 23-2 of the processing pipeline circuit 3; and the register file 4-2 are saved in the first save memory 42.

In this manner, when the interrupt occurs during the data saving, the reception of the interrupt control signal is held until the data saving is completed. Thus, the data can be reliably saved and the task switching can be performed without a time overhead.

FIG. 9 is another timing chart for explaining task switching performed due to an external interruptservice. This example is described in connection with the operations when an interrupt service occurs during data restoring.

As shown in FIG. 9, upon reception of input of an interrupt control signal from the outside at time T11 during data restoring while a task-2 is executed, the data restoring is stopped. At time T12, the task switch controller 41 controls the switch 52 to switch to the selection of the program counter 1-1 from the selection of the program counter 1-2, and controls the switches 68 and 69 to switch to the path of the register file 4-1 from the path of the register file 4-2.

Thus, data on a task-3 saved in the first save memory 42 is restored in the program counter 1-1; the memory devices 20-1, 21-1, 22-1 and 23-1 of the processing pipeline circuit 3; and the register file 4-1, respectively, to execute the task-3, while the task-2 which has been executed is suspended. The data restored partially is overwritten by the interrupting task-3.

After the interrupt service is completed at time T19, the task switch controller 41 controls the switches 68 and 69 at time T20 to switch to the path of the register file 4-2 from the path of the register file 4-1. Thus, the suspended task-2 is resumed, and the data restoring suspended by the interrupt is resumed at time T20.

In this manner, when the interrupt occurs during the data restoring, the restoring is suspended, and resumed when the interrupt service is completed, so that the data can be restored reliably and the task switching can be performed without a time overhead.

As described above, the data in the register file on the opposite side, which is not used for the arithmetic processing, is saved in the first save memory 42, and then the data to be processed next is restored in that register file from the first save memory 42, thereby making it possible to realize the task switching without a time overhead for a substantially unlimited number of interrupt services.

What is claimed is:

1. A microprocessor comprising:
   a pipeline task execution module having at least two stages, including:
   (i) at least two, one-element arithmetic means for performing arithmetic processing of task data, each defining a corresponding stage;
   (ii) at least two-element memory means associated with a respective one of the at least two stages for storing said task data processed by said associated, one-element arithmetic means;
   task control means for saving data on a second task held by the other of said at least two-element memory means while a first task is executed by using said at least two-element memory means selected by said task control means, said task control means selects said other of said at least two, two-element memory means when an interrupt control signal is input from outside, and performs control such that, if said interrupt control signal is input while said task data is saved by said at least two, two-element memory means, said interrupt control signal is held until saving of said task data is completed by said at least two, two-element memory means, and said other of said at least two-element memory means is selected when the saving of said task data is completed; and
   restore means for restoring task data on a third task stored in a save means to said other memory means while said first task is executed by using said at least two-element memory means selected by said task control means.

2. The microprocessor according to claim 1, wherein said task control means performs control to select said other of said at least two-element memory means when a task switch control signal is produced.

3. The microprocessor according to claim 1, wherein said at least two, two-element memory means includes a register file.

4. The microprocessor according to claim 1, wherein said restore means includes a plurality of restore means interconnected with one another.

5. The microprocessor according to claim 1, said restore means is connected to a memory present outside said microprocessor and to said one-element arithmetic means to cause said restore means to operate as a memory or a cache present outside said microprocessor.

6. A microprocessor comprising:
   a pipelined task execution module having at least two stages, including:
   (i) at least two, one-element arithmetic means for performing arithmetic processing of task data, each defining a corresponding stage;
   (ii) at least two, two-element memory means associated with a respective one of the at least two stages for storing said task data processed by said associated, one-element arithmetic means;
   task control means for saving data on a second task held by the other of said at least two-element memory means while a first task is executed by using said at least two-element memory means selected by said task control means, said task control means selects said other of said at least two, two-element memory means when an interrupt control signal is input from outside, and performs control such that, when said interrupt control signal is input while said task data is restored by said restore means, restoring of said task data is stopped and said other of said at least two-element memory means is selected; and restore means for restoring task data on a third task stored in a save means to said other memory means while said first task is executed by using said at least two-element memory means selected by said task control means.

7. A microprocessor comprising:
   a pipelined task execution module having at least two stages, including:
   (i) at least two, one arithmetic unit configured to perform arithmetic processing of task data, each defining a corresponding stage;
   (ii) at least two, two memory units associated with a respective one of the at least two stages configured to store said task data processed by said associated, one-element arithmetic unit;
   a task controller configured to save data on a second task held by the other of said at least two-element memory unit while a first task is executed by using said at least two-element memory unit selected by said task controller, said task controller selects said other of said at least two, two-element memory units when an interrupt control signal is input from outsie, and performs control such that, if said interrupt control signal is input while said task data is saved by said two, two-element memory units, said interrupt control signal is held until saving of said task data is completed by said two, two-element memory units, and said other of said at least two, two-element memory units is selected when the saving of said task data is completed; and
   a restore unit configured to restore task data on a third task stored in a save unit to said other of said at least two-element memory unit while said first task is executed by using said memory unit selected by said task controller.

8. A microprocessor comprising:
   a pipelined task execution module having at least two stages, including:
   (i) at least two, one arithmetic unit configured to perform arithmetic processing of task data, each defining a corresponding stage;
   (ii) at least two, two memory units associated with a respective one of the at least two stages configured to store said task data processed by said associated, one-element arithmetic unit;

a task controller configured to save data on a second task held by the other of said at least two-element memory unit while a first task is executed by using said at least two-element memory unit selected by said task controller, said task controller selects said other of said at least two, two-element memory units when an interrupt control signal is input from outside, and said task control means performs control such that, when said interrupt control signal is input while said task data is restored by said restore means, restoring of said task data is stopped and said other of said at least two-element memory means is selected, and a restore unit configured to restore task data on a third task stored in a save unit said at least two-element memory unit while said first task is executed by using said memory unit selected by said task controller.

* * * * *